Figure 1:
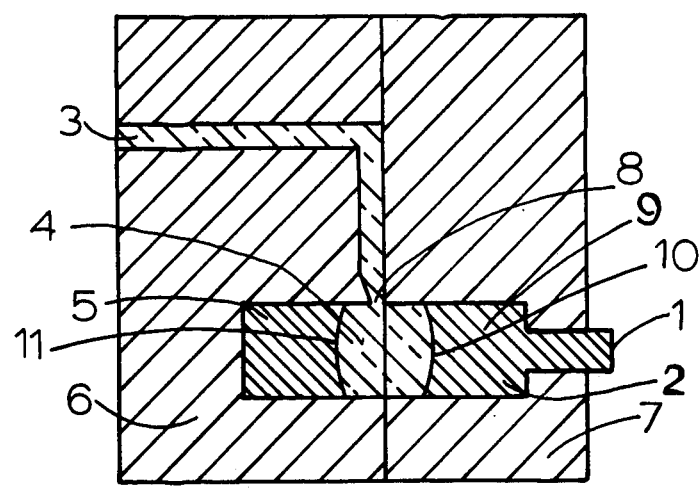

United States Patent [19]

Neefe

[11] 4,284,591
[45] Aug. 18, 1981

[54] INJECTION MOLDING OF OPTICAL LENSES AND OPTICAL MOLDS

[75] Inventor: Charles W. Neefe, Big Spring, Tex.

[73] Assignee: Neefe Optica Lab Inc., Big Spring, Tex.

[21] Appl. No.: 200,261

[22] Filed: Oct. 23, 1980

Related U.S. Application Data

[63] Continuation-in-part of Ser. No. 144,565, Apr. 28, 1980, abandoned, which is a continuation-in-part of Ser. No. 31,479, Apr. 19, 1979, abandoned, which is a continuation-in-part of Ser. No. 793,388, May 25, 1977, abandoned.

[51] Int. Cl.$^3$ ............................................. B29D 11/00
[52] U.S. Cl. .................................... 264/1.1; 264/2.2; 264/2.5; 425/808
[58] Field of Search ........................ 264/2.2, 2.5, 1.1; 425/808

[56] References Cited

U.S. PATENT DOCUMENTS

| 2,233,057 | 2/1941 | Luce | 425/808 |
| 4,091,057 | 8/1975 | Weber | 264/2.2 |

Primary Examiner—James B. Lowe

[57] ABSTRACT

A method of maintaining contact between the injected molded resinous optical surface and the mold by rapid filling of the mold through a restricted orifice and by mechanically moving the mold against the resin as it cools and shrinks.

3 Claims, 1 Drawing Figure

INJECTION MOLDING OF OPTICAL LENSES AND OPTICAL MOLDS

This is a continuation-in-part of application Ser. No. 144,565 filed Apr. 28, 1980 entitled: INJECTION MOLDING QUALITY OPTICAL LENSES, now abandoned, which is a continuation-in-part of application Ser. No. 31,479, filed Apr. 19, 1979 entitled: INJECTION MOLDING OPTICAL LENSES, now abandoned, which is a continutation-in-part of application Ser. No. 793,388, filed May 25, 1977 entitled: A METHOD OF MAKING HIGH QUALITY PLASTIC LENSES, now abandoned.

PRIOR ART

The use of plastic materials for making optical lenses has increased rapidly for the past ten years. This is due to the availability of better plastic materials and the physical advantages of the plastic resins for specific application, such as ophthalmic lenses. The technology for the production of high quality plastic lenses has not kept pace with the material supply industry. It is important to advance both areas if the full potential is to be realized.

The present invention relates to art of injection molding fine quality optical lenses.

Plastic lenses offer many advantages over glass lenses. They are much lighter in weight and resist breakage. The cost of making high quality lenses has been high, due to the problems caused by the coating system used and the shrinkage of the monomer when polymerized.

The current casting process used lens molds which are fabricated from glass, each mold is individually ground and polished to the required specifications. To achieve accurate reproduction of the bifocal and lenticular molds is most difficult and expensive. This new process makes possible exact reproduction and has many other distinct advantages which will become apparent from the following disclosure.

High quality lenses have been ground and polished since the beginning of the optical industry. The production of aspheric and special curvature lenses have been expensive and limited. Plastic eye glasses have been cast between glass molds which were ground and polished by the old method. In later years, compression molding has been used to produce high quality optical lenses.

Injection molded lenses have been of poorer quality due to problems of weld lines of filling and the rapid cooling required and accompanying shrinkage of the resin after it is injected into the mold cavity. Mold fidelity can not be maintained as the plastic material pulls away as it cools and shrinks from the mold surface.

An object is to provide a process for making high quality, inexpensive injection molded lenses which may be made to identical specifications.

Another object is to provide finished molded lenses, finished with properly formed surface conforming to predetermined specifications.

The present invention overcomes the above mentioned problems by providing a moving mold element which will move inward as the resinous material cools maintaining contact with the lens surface until the mold is opened.

In the drawing, FIG. 1 shows the mold in section.

THE LENSES ARE MADE AS FOLLOWS

A mold body composed of two steel parts 6 and 7, having two cavities to accept the optical mold inserts 2 and 5. The inserts may be stainless steel, glass or other materials which will withstand molding pressures up to 20,000 pounds per square inch. Among the materials found to make excellent injected lenses are polymethylmethacrylate, polystyrene, transparent nylons, polyvinayl chloride and polycarbonates. A runner tube 3, is provided through which the heated and melted resinous material is injected at high speed and pressure of from 10,000 to 20,000 pounds per square inch. A gate of restricted opening 8, is provided at the edge of the lens cavity. The restricted gate further increases the velocity of the molten plastic material as it enters the mold and frictional heat of the molecular internal shear force lowers the viscosity of the melted material enabling it to completely fill the mold and exert its full force against the optical surfaces of the mold 10 and 11, leaving no knit line. The pressure within the mold cavity will rise to equal the pressure found in the runner tubes. The injection mold filling pattern can be studied by adjusting the quantity of material so as not to completely fill the mold cavity, if the injection speed and pressure are maintained, a frozen example of the injection pattern may be obtained. This enabled us to find that high velocity and low viscosity injection through a nozzel like gate caused the resin material to travel across the lens mold and fill from the center line outward to the two sides, leaving no weld or knit lines. The gate is a tapered opening which forces the liquid to a smaller area and thereby increases the velocity. A tapered gate is provided which decreases from 250 thousandths inch to 25 thousandths inch in a distance of one half of an inch. This provides a 10 fold increase in resin velocity. This discovered effect is enhanced by placing air vents at the sides 90° removed from the entrance gate to reduce the flow resistance in that direction by allowing the air to escape. These air vents are located at the parting line of the mold and are from one to three thousandths of an inch in width and from 10 to 40 thousandths inch in length along the parting line. No flow of the resin lens material into the air vents has ever been seen. Due to the thin cross section of the vents only air may escape as the more viscosus resin will freeze at the metal surface and not enter the thin air vents. The mold inset 2, is of size to form a sliding fit within the mold body 7. When the mold cavity 4 is filled with the melted resinous material and movement through the gate 8 has stopped, the metal mold absorbs heat from the resinous material and gate 8, freezes as the material hardens first in the gate area, sealing the liquid lens material between the molds. When the gate is sealed, mechanical pressure is applied to the mold 9 by applying hydraulic or other mechanical force to rod 1, and moving the mold 9, forward against the resinous material until it cools to a solid. When sufficient cooling has occured to render the lens 4, a solid lens structure below the glass transition temperature and the optical surface 10 and 11, remains in contact with the lens material 4, the mold is opened and the lens removed. Pressure is maintained against the lens material 4, until the mold is opened assuring contact and complete reproduction of the mold surfaces and the lens. This optical molding procedure is also used to produce resinous lens molds into which optical lenses are cast. This is accomplished by molding a cuplike container having an optical surface present at the bottom of the cup-like container. The lens liquid monomer and suitable catalyst are placed in the cup-like container and the monomer is allowed to polymerize to form a solid lens material having a cast optical surface molded by the optical surface present on the bottom of the resinous cup-like mold. The resinous cup-like optical lens mold being injection molded by the herein described method.

Various modifications can be made without departing from the spirit of this invention or the scope of the appended claims. The constants set forth in this disclosure are given as examples and in no way are final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of molding optical lenses by the steps of heating and melting a resinous lens material, forcing with pressure the heated and melted resinous material into a runner tube and through a tapered restricted opening at the edge of the mold cavity, the velocity of the melted resinous material being increased upon passing through the tapered restricted opening and the temperature of the melted resinous material is increased by internal frictional forces upon passing through the tapered restricted opening and the viscosity of the melted resinous material is lowered upon passing through the tapered restricted opening, filling the lens mold cavity with the heated low viscosity resinous material, by allowing the melted lens material to rapidly move from the tapered restricted opening across the lens mold cavity, the molten lens material entering at the restricted opening and moving across to the opposite edge of the lens cavity to a point 180° removed from the entry gate and filling the lens cavity from the center line toward the two sides located 90° removed from the filling opening and providing air vents having a opening width of from one to three thousandths of an inch at the sides 90° removed from the filling opening, allowing the pressure within the mold cavity to equal the pressure present in the runner tube, allowing the heated resinous material to cool until the resinous material present in said restricted opening is solidified and sealing the molten lens material within the mold cavity, providing one stationary and one moveable opposed curved optical mold surfaces within said mold cavity, applying external force to the moveable optical mold surface moving said optical mold surface against the heated and melted resinous material present within the mold cavity, maintaining the external applied force on the resinous material and allowing the resinous material to cool and become a solid, opening the mold and removing the resinous optical lens.

2. A method of molding optical lenses by the steps of heating and melting a resinous material, forcing with pressure the heated and melted resinous material into a runner tube and through a restricted opening at the edge of the mold cavity, the velocity of the melted resinous material being increased upon passing through the restricted opening and the temperature of the melted resinous material is increased by internal frictional forces upon passing through the restricted opening and the viscosity of the melted resinous material is lowered upon passing through the restricted opening, filling the lens mold cavity with the twice heated and low viscosity resinous material, by allowing the melted lens material to rapidly move across the lens mold cavity, entering at the restricted opening and moving to the opposite edge of the lens cavity to a point 180° removed from the entry gate and filling the lens cavity toward the two sides located 90° removed from the filling opening and providing air vents having an opening width of from one to three thousandths of an inch at the sides 90° removed from the filling opening, allowing the pressure within the mold cavity to equal the pressure present in the runner tube, allowing the resinous material to cool and become a solid, opening the mold and removing the resinous optical lens.

3. A method of molding optical lens molds by the steps of heating and melting a resinous material, forcing with pressure the heated and melted resinous material into a runner tube and through a restricted opening at the edge of the mold cavity, the velocity of the melted resinous material being increased upon passing through the restricted opening and the temperature of the melted resinous material is increased by internal frictional forces upon passing through the restricted opening and the viscosity of the melted resinous material is lowered upon passing through the restricted opening, filling the lens mold cavity with the twice heated and low viscosity resinous material, by allowing the melted lens material to rapidly move across the lens mold cavity, entering at the restricted opening and moving to the opposite edge of the lens mold cavity to a point 180° removed from the entry gate and filling the lens mold cavity toward the two sides located 90° removed from the filling opening and providing air vents having an opening width of from one to three thousandths of an inch at the sides 90° removed from the filling opening, allowing the pressure within the mold cavity to equal the pressure present in the runner tube, allowing the resinous material to cool and become a solid, opening the mold and removing the resinous optical lens mold.

* * * * *